(12) United States Patent
DeGroot et al.

(10) Patent No.: US 6,182,277 B1
(45) Date of Patent: *Jan. 30, 2001

(54) METHODS AND APPARATUS FOR DECLARATIVE PROGRAMMING TECHNIQUES IN AN OBJECT ORIENTED ENVIRONMENT

(75) Inventors: Michael DeGroot, Cupertino; Ralph Lemke, Sunnyvale, both of CA (US)

(73) Assignee: Oracle Corporation

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/060,531

(22) Filed: Apr. 15, 1998

(51) Int. Cl.$^7$ .................................................. G06F 9/45
(52) U.S. Cl. .................................................. 717/1
(58) Field of Search ................... 395/701, 710; 717/1, 10, 4

(56) References Cited

U.S. PATENT DOCUMENTS

| | | | |
|---|---|---|---|
| 5,404,525 | * 4/1995 | Endicott et al. | 395/702 |
| 5,493,680 | * 2/1996 | Danforth | 395/702 |
| 5,493,682 | * 2/1996 | Tyra et al. | 395/703 |
| 5,560,014 | * 9/1996 | Imamura | 395/701 |
| 5,615,400 | * 3/1997 | Cowsar et al. | 709/305 |
| 5,644,770 | * 7/1997 | Burke et al. | 395/710 |
| 5,710,925 | * 1/1998 | Leach et al. | 709/303 |
| 5,864,862 | * 1/1999 | Kriens et al. | 707/103 |
| 5,867,709 | * 2/1999 | Klencke | 395/702 |
| 5,920,725 | * 7/1999 | Ma et al. | 395/712 |
| 5,933,638 | * 3/1999 | Cencik | 717/4 |
| 5,978,579 | * 11/1999 | Buxton et al. | 717/1 |
| 6,008,806 | * 12/1999 | Nakajima et al. | 345/335 |

OTHER PUBLICATIONS

Title: Method of Extended linking Using Identification files, IBM Technical Disclosure Bulletin, Mar. 1991.*
Title: Automatically generating formatted documentation for object oriented class libraries, IBM Technical Disclosure Bulletin, Dec. 1994.*
Title: Generalization based data mining in object oriented database using an object cube model, Data & knowledge engineering, Mar. 1998.*
Title: Consistency enforcement in entity relationship and object oriented models, Data & knowledge engineering, Oct. 1998.*

* cited by examiner

*Primary Examiner*—Tariq R. Hafiz
*Assistant Examiner*—Chameli C. Das
(74) *Attorney, Agent, or Firm*—Stattler Johansen & Adeli LLP

(57) ABSTRACT

An object oriented software environment permits, through declarative programming techniques, customization of functionality of an object. The object oriented software environment includes a plurality of objects, wherein each object contains at least one method. A user of the object oriented software environment submits one or more declarative statements to augment the functionality of a method on an object. In response, the object oriented software environment associates the declarative statements to the method identified on the object such that when the method on the object is called, the declarative statements, associated with the object, are executed in addition to the methods on the object. The declarative programming technique permits augmenting the functionality of a method on an object with "rules." In addition, two or more methods may be associated together to generate an event that propagates from one method to another method. The programming techniques disclosed also permit integration of declarative, compiled and scripting approaches to integrate three styles of applications program development.

17 Claims, 11 Drawing Sheets

Order Entry
State Model

METHODS AND APPARATUS FOR DECLARATIVE PROGRAMMING TECHNIQUES IN AN OBJECT ORIENTED ENVIRONMENT

BACKGROUND OF THE INVENTION

1. Field of the Invention

The present invention is directed toward the field of object oriented programming, and more specifically to methods, apparatus, and computer readable medium for enhancing declarative programming in an object-oriented system.

2. Art Background

An object oriented approach to programming provides many advantages over traditional procedural programming approaches. For example, an object oriented approach permits code reuse through inheritance and modularity through encapsulation. There are many views as to what concepts define object oriented programming, and there are many terms and definitions for defining these concepts. In general, objects incorporate procedures, also called methods or operations, and data, also called attributes or properties. Objects are instantiated from and described by structures known as classes or types. For purposes of nomenclature, the object oriented programming environment described herein defines classes as types. A type is a general abstract specification, and an object instantiated from a type is a specific concrete instance of the type.

A type consists of an interface and an implementation. The interface comprises variables and function declarations, wherein the variables represent the attributes of the type, and the function declarations specify methods for manipulating those attributes as well as performing other operations. The declaration specifies the name, return type, and argument, known collectively as the signature. The implementation refers to the actual code that implements the methods specified in the interface. Types may consist of abstract types or implementation types. Objects are not instantiated from abstract types. Instead, objects are instantiated from an implementation type.

In general, objects communicate through message passing mechanisms. An object, known as a client object, may call a method of another object. A client object invokes a method of another object by accessing the object via the defined interfaces. Thus, to invoke a method in an object or to query an object, the client object requires knowledge of the signatures of the methods in the interface of the target object. The client object calls the methods and passes the appropriate parameters. For example, to obtain the value of an attribute in an object, a client object calls a method, via an interface, to obtain the value.

The concept of isolating the implementation of the methods and attributes within an object is known as encapsulation. Encapsulation is a powerful feature of object oriented systems because it separates the external part of an object (e.g., the part exposed to the objects user) from the internal part (e.g., the structure and implementation). Therefore, encapsulation permits changing the object implementation without affecting the interaction with other functions or objects as long as the interface does not change.

Object oriented languages, such as the C++ programming language, permit the creation of special types via inheritance. In general, inheritance is a mechanism for passing attributes and methods from a parent or base type to one or more child or derived types. Inheritance permits code reuse because interfaces and implementations need not be duplicated in the child type. Instead, the interfaces and implementations may be incorporated in any child type through reference of the parent or base type.

Just as there are many different concepts that define object oriented programming, there are also many different and diverse object oriented systems. One example of how object oriented systems differ is in methods of code reuse.

As discussed above, object oriented programming techniques permit code reuse through reuse of objects. However, in certain circumstances, a programmer may desire to alter an existing object without creating an entirely new object. Instead of creating a new and distinct object, current object oriented programming techniques permit a program developer to "subclass" the object. Generally, subclassing techniques permit a developer to generate a new method on a subclass, such that the new subclass has a method different from a method in the original class. Redirecting a call from an old method of a class to a new method in a subclass is known as method overriding.

Typically, object interfaces include a plurality of pointers that point to a table of pointers, known as a virtual table (v_table.) In general, subclassing techniques involve changing the pointer in an object's v_table to point to a new function or method. When the method on that object is called, the v_table directs the call to the new function or method. To implement subclassing, a program developer requires access to the object's metadata to modify the object's v_table. However, a software developer does not always have access to an object's metadata. For example, if the software developer is using an object that consists of C++ compiled code, then the developer does not have access to the object's v_table, and the subclassing technique is not available to augment or change the methods on the object. The software developer also requires knowledge of the signatures of all of the methods on the object. The location of the v_table is compiler dependent, and thus is not readily known from objects compiled from different compilers. In addition, to alter the v_table, the software developer requires knowledge of the location of the object's v_table. Furthermore, the subclassing technique requires re-compiling the code, which in turn requires shutting down the application and reloading both the new and old code. Thus, it is desirable to provide a technique to permit augmentation of a method, to alter the behavior of an object, even though the source metadata is not available to the software developer.

There are various ways to approach application program development in an object oriented programming environment. A declarative approach permits an application developer to express declarations by coding these declarations into the system. Although the declarative approach works best for certain tasks, such as adding features to an existing system, some functions cannot be expressed in a declarative manner.

Other systems permit application development through traditional code development cycles. For example, programming languages, such as third generation languages (3GL), may be used to specify functionality through development of class objects. This approach to application development requires compiling code to generate executable run time code. Although the 3GL compiled approach is perhaps the most powerful approach, it is also the most resource intensive and time consuming approach.

A third approach to application development in an object oriented system is through use of fourth generation languages (4GL). The 4GL approach permits adding functionality to currently existing systems. Although each approach has benefits, it is desirable to permit integration of all three styles of application building.

To support application program development, a number of tools and editors are used. One such tool permits diagramming events to model an application program. Although these diagrammers provide a starting point for code development, they do not adequately capture how objects are affected as the objects progress through the system. The modeling tools do not describe the structure and behavior of the objects. For example, prior art systems capture information about the system so that the user may query to determine the relationship between objects, and how these objects move through the system. Although these queries are informative, they do not provide a means to enforce, through declarations, this relational information. Therefore, it is desirable to provide an object oriented system that enforces declarations to effect the relationships among objects in the system.

SUMMARY OF THE INVENTION

Figure 1:
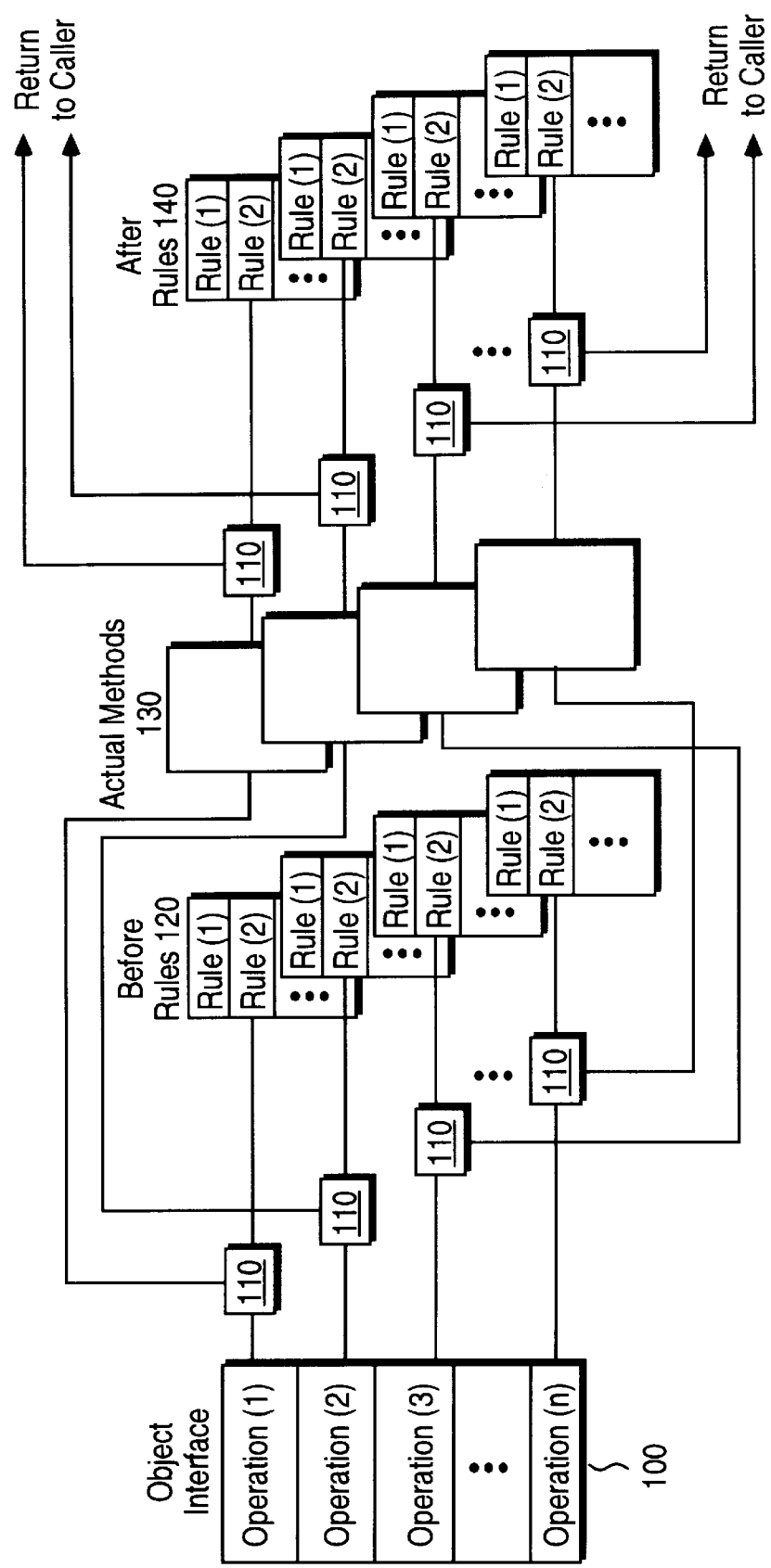
FIG. 1 illustrates one embodiment for implementing rules with an object.

Declarative programming techniques in an object oriented software environment permit customizing functionality of an object. The object oriented software environment includes a plurality of objects, wherein each object contains at least one method. The user of the object oriented software environment, such as an applications developer, submits one or more declarative statements to augment the functionality of at least one method of an object. In response, the object oriented software environment associates the declarative statements to the method identified on the object such that when the method on the object is called, the declarative statements, associated with the object, are executed in addition to the methods on the object. The declarative programming technique permits augmenting the functionality of a method on an object with "rules." In addition, two or more methods may be associated together to generate an event that propagates from one method to another method.

In one embodiment, the rules may be either "before" rules, which are executed prior to execution of the associated method, or "after" rules, which are executed subsequent to the associated method. The declarative programming techniques permit augmentation of methods both on the type system level and on the instance level. Thus, the user is permitted to associate declarative statements to a method on a specific instance of the object, or associate declarative statements to a method on all instances of the object.

The programming techniques of the present invention also permit integration of declarative, compiled and scripting approaches for developing application programs in an object oriented environment. An abstract specification for an extended definition type system, which includes members to enforce rules through the type system, is implemented. Declarative rules, which implement functionality for applications program development, are enforced as rules in the type system. Complied code, developed from an object oriented language and compiled to include the extended definitions for the type system, operates in conjunction with the declarative rules. Scripts, developed from a fourth generation language (4GL), which specify additional functionality for applications program development, are also integrated so that the scripts are enforced as rules in the type system.

DETAILED DESCRIPTION OF THE PREFERRED EMBODIMENTS

An Overview of Rules

In general, rules are high level requirements or functions that augment the functionality of methods of an object. In one embodiment, rules are declarative techniques, that set forth requirements or parameters that define object behavior. As is described more fully below, the rules of the present invention may be implemented with different editors and tools, including editors and tools that are not designed to operative cooperatively (e.g., editors and tools that are not generally compatible to operate with different type systems). Also, rules may be added to objects of an applications program, even though the underlying method is compiled, and the source metadata for the underlying object is not available.

FIG. 1 illustrates one embodiment for implementing rules with an object. An object interface 100 includes, in part, a plurality of operations, labeled operation$_1$, operation$_2$, operation$_3$ ... operation$_n$. For purposes of nomenclature, an operation as used herein describes a "slot" in a virtual table ("v_table"). Unlike a method, an operation does not connote a specific implementation. As shown in FIG. 1, each operation on the object interface 100 has a corresponding list of "before rules" 120. Also shown in FIG. 1 is a plurality of actual methods 130. The actual methods 130 represent the original implementation of the object prior to augmentation by the rules of the present invention. A decision block 110 directs the thread of execution of the program from an operation on the object interface 100 to either the corresponding list of before rules 120 or the actual method 130.

A list of "after rules" 140 corresponds to each of the actual methods 130 as indicated by the lines on FIG. 1. The after rules 140 includes a list of one or more rules for execution subsequent to execution of the corresponding actual method 130. Similar to the before rules 120, the actual methods 130 are shown coupled to the after rules 140 via decision blocks 110. The decision blocks 110 indicate whether the thread of execution of a program is directed from the actual methods 130 to the after rules 140, or whether the thread of execution returns directly to the caller (e.g., the caller that invoked the operation on the object interface 100).

Figure 2:
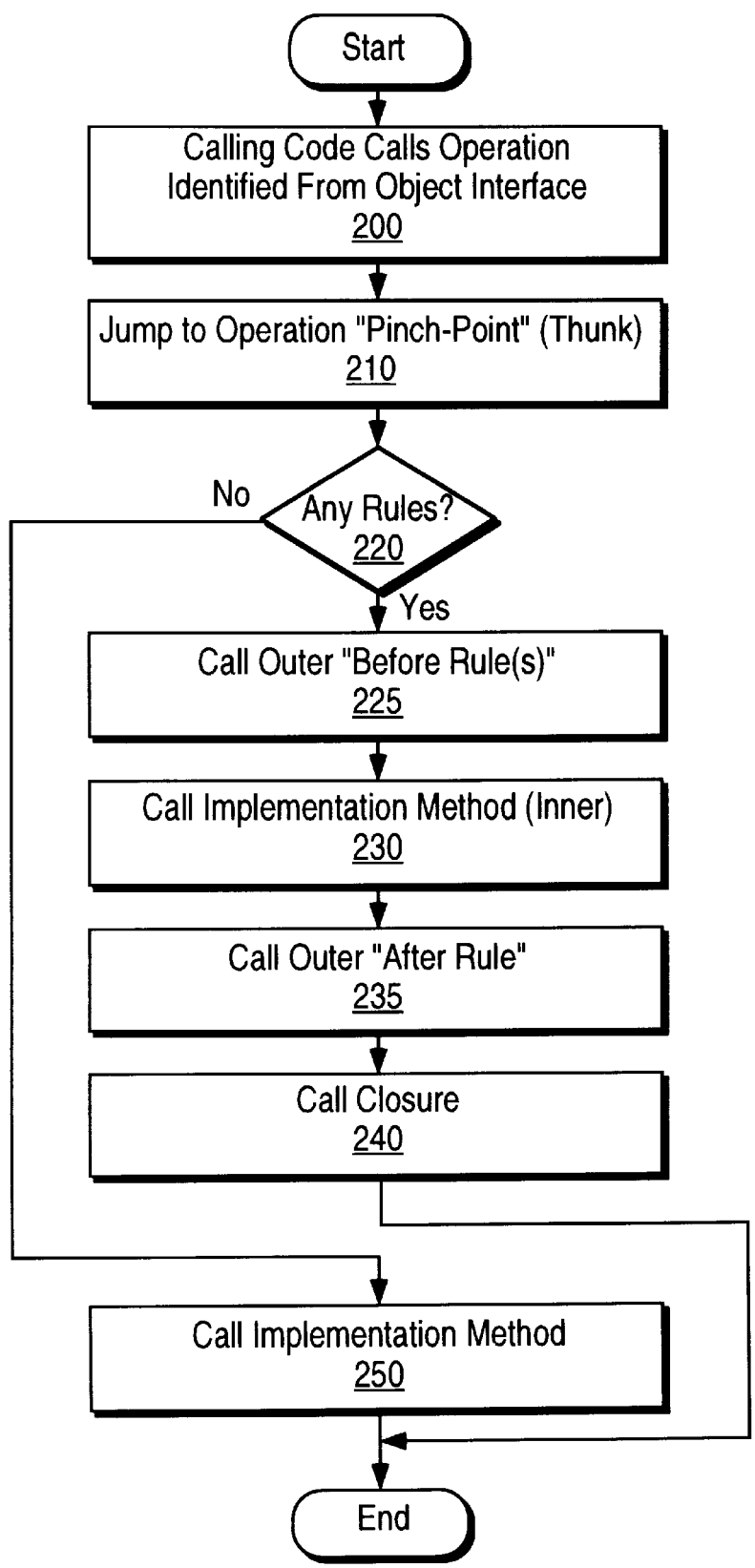
FIG. 2 is a flow diagram illustrating one embodiment for a program flow that implements rules.

FIG. 2 is a flow diagram illustrating one embodiment for a program flow that implements rules. The calling code (e.g., the caller) initiates the flow through calling an operation identified on an object interface as shown in block 200. In response to the call, the thread of execution for the program flow jumps to an operation "pinch-point." In one embodiment, the pinch-point operation is implemented efficiently with a thunk, as explained more fully below. The pinch-point operation determines whether there are any rules associated with the corresponding operation as illustrated by block 220. If rules exist for the corresponding operation, the "outer" shell is entered and a determination/execution of before rules is made. The implementation method is called as shown in block 230. As shown in block 235, the after rules determination/execution is made in the outer shell. To exit the outer shell, a closure method is called as shown in block 250. Alternatively, if there are no rules for the corresponding operation, the program flow jumps to call the implementation method (block 250.)

The rules of the present invention have many applications in software programs to add or alter the functionality of an object. One application for rules is to define the range of parameters acceptable for execution of a method on an object. For example, a "time" method may utilize, as a parameter, a day of a month (e.g., day attribute). A rule, implemented as a before rule for the time method, checks whether the value stored in the "day" attribute is a valid day for the corresponding "month" parameter (e.g., the day parameter is a value between 1 and 30 for the month of September).

The rules of the present invention have application to implement conditions or requirements prior to execution of methods on an object. This application of rules permits a user to set certain requirements prior to invocation of the method (e.g., a method). For example, in an order entry application program, the user may specify the requirement that before the "ship" method is executed, the shipping information, used by the ship method, must exist.

The rules of the present invention may also operate in conjunction with states and state models. State models, defined to model the behavior of an applications program, transition from one state to another state based on conditions and events that occur during the execution of the application program. For an object oriented system that utilizes state models, rules may be used in conjunction with state models. In general, state rules determine and enforce state conditions before and after execution of a rule, as well as enforce transition from one state to another state. Another application for rules for use in state models is to determine that an object is in a proper state prior to invocation of the associated method. For example, a rule may check that an object is in a proper state prior to calling a method. If it is not, the rule may execute an error routine, such as displaying information on the output display to indicate the nature of the error.

Rules also have application to implement help or instructional messages in software programs. For example, a before rule may be executed to display, in a dialog box, a help message that provides instructions to walk the user through the applications program prior to executing the actual method.

Rules have further application to relate prior methods, and their results, to actual methods of the operation called. For example, a rule may declare that no method, previously executed, may fail, or else an error is generated.

The after rules have application to add functionality based on the outcome of the actual method. For example, if a parameter, as a result of executing the actual method, is set to a value within a predetermined range, then the rule executes an action. The before rules of the present invention may be used for error recovery. For example, if a method requires a specific range of values for a parameter, one or more before rules may check to determine if the values of the parameters are within the range, and if not, truncate the values for subsequent execution of the method. As an error recovery technique, a before rule may also display a dialog box to request new parameter values within the required range.

The declarative statement of a rule may be expressed in any form. In one embodiment, rules are expressed using the basic programming language. The declarative statement may call a different routine or method depending upon the output of the actual method associated with the rule. For example, to implement an after rule that calls a routine based on a parameter value, the rule may set forth:

If Attribute A≧X, then call method Y. Similarly, several conditions may be linked together through logical operands (e.g., AND, OR, XOR, NOR, etc.).

In addition to parameter validation, rules may enforce conditions that check and enforce certain conditions including, cardinality, mandatory presence of a parameter, inclusive (e.g. one must have a value), exclusive (e.g., only one must have a value). Derivation rules are of the type that support attribute dependency chaining, generating default values, etc.

Modeling Approach To Applications Program Development

In one embodiment, the type system for the object oriented development environment permits the use of state models. The behavior of an object may be specified through one or more state models. Within an object, a condition, which is identified by an application developer, controls the logical progression of the application. These conditions, which control the progression of the application, are called "states." Each state is provided with a list of one or more valid predecessor and successor states. For example, a "sales order" object, developed for a sales order entry application, may include state declarations that an instance of the object must pass through an "approved state" before reaching a "shipped state." In addition, the states are specified with conditions to be observed and events to be raised when a transition from one state to another is proposed.

In general, rules support the declarative style of application development. Specifically, rules permit an application developer to specify declarations about the function of the system, and the system enforces these declarations on the type system level. Rules, if they are linked to states, can be turned on and off. There are many triggers that may invoke enforcement of a rule. For example, triggers may include receiving an event, calling a method, entering or leaving a state, moving through a state transition, and changing and/or assessing an attribute of an object.

For each rule, a trigger invokes the rule, a condition determines a course of action, and an action implements or enforces the rule. An example rule may be triggered when a method is called. For this example rule, the condition may be based on the state of an attribute in the called method's object. Based on the condition (e.g., the state of the attribute), an action is executed such as returning an error or an exception. An action may also include changing the state for a state model.

For purposes of nomenclature, an event is a notification or an announcement from an object. Events are a special case of rules. Objects register or subscribe to events in order to receive the event notification upon occurrence of the specified event. Unlike an attribute, an event communicates to other objects that something has occurred. An event is not a method call, but methods may be invoked as a result of the occurrence of an event. A method call invokes a one to one relationship between the caller and the method. In contrast, with events, there is a one to many relationship between the object that raises the event and the objects that receive the event.

In certain circumstances, a single user action may precipitate the firing of a sequence of related events. While the object is in the process of firing this sequence of events, the object relinquishes the thread of execution to event handlers which, may in turn, attempt to set properties and call methods on the object that is the source object of the event. Because of this, an object may enter a special state that disallows some subset of normally permissible activities on the source object. Objects are required to handle reentrant situations, but they are not required to be arbitrarily functional when reentered. For example, while firing a request event, it may be illegal to call a method on the object which would itself fire the request event. The limitation to disallow certain functions is up to the object, but user written code may attempt implausible actions on the object.

As discussed above, an event is a notification or announcement made by an object. Like a method, an event has a signature that includes a name, parameter list, return value, and exception list. Information about a particular event is passed via the parameter specified in the event signature. The parameters may be simple values or complex structures. In one embodiment, source objects package information into a packet that represents information common to all events. Additional arguments may be passed as extra parameters. Event categories provide a convenient way to classify and organize events.

An object that raises an event is called a source object, and an object that receives an event is called a sink object. Thus, the source object generates the event, and the sink object is the recipient or subscriber for the particular event. A request event is utilized to ask permission from the sink objects. The sink objects can either grant permission or refuse. Events, known as "before" events, are fired before a specified action occurs. The "before" events provide sink objects an opportunity to prepare for the event. Events, known as "after" events, are fired after a specified action. The after events give sink objects an opportunity to respond to this action. The "before" and "after" events may not be canceled.

In addition to "before" and "after" events, "do" events are fired to provide sink objects an opportunity to supplement default behavior. The "do" event is called directly before the source object performs the action. The sink object returns a value that determines whether the source action should be done.

In general, objects respond to events by calling related methods. For example, an order object may respond to a "ship order" event by calling a "ship order" method. For purposes of nomenclature, the process of raising and responding to events is entitled "event propagation." Event propagation begins with a source object raising an event, and it ends with a method being called on the sink object. One or more sink objects register or subscribe to a source object's event. In addition, event signatures or categories may be dynamically added at run time. Sink objects may register interest in event signatures even if the source object does not currently export the event (e.g., in a programming environment, the source can raise events dynamically without prior notice of their existence). Consequently, events form a one to many relationship among the events source object, the type of event, and the event sink.

An event transformer is an object that is logically situated between a source object and a sink object. The purposes of an event transformer are to perform impedance matching between the source and sink objects and to perform calculation and event flow. In general, event propagation relies on the fact that the sink object implements the exact event signature. For example, if an event signature is specified with two parameters, then the source object passes two parameters and all of the sink objects are implemented with the two parameters. If the sink object does not implement the exact signature required by the source object, then an event transformer is required to provide matching of signatures. The event transformers then receive the event on behalf of the sink object, perform some rearrangement or calculation of the event information, and then redispatch the event to the sink object.

Figure 3:
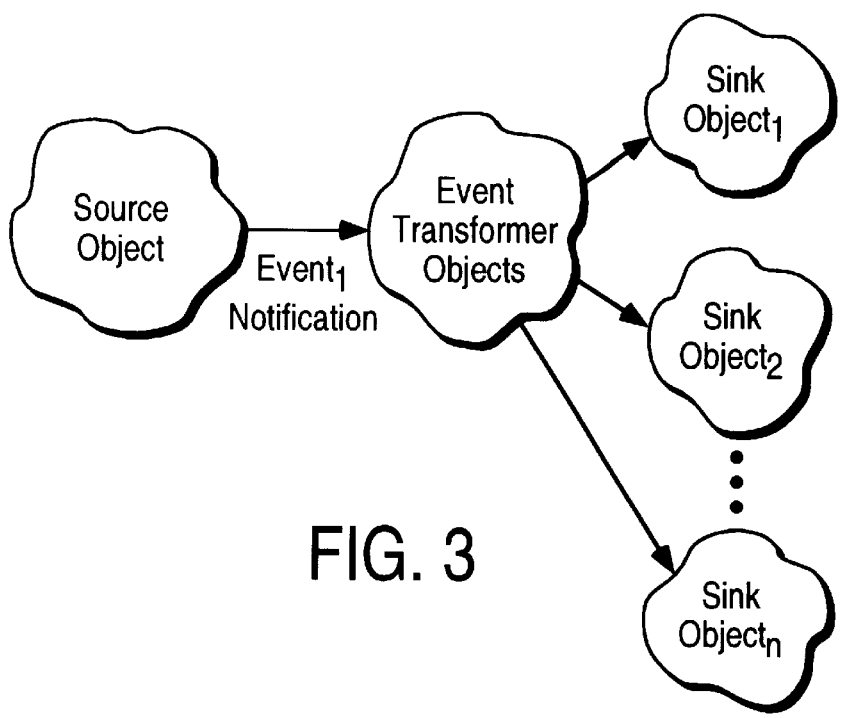
FIG. 3 illustrates an abstract representation of event propagation in the type system.

FIG. 3 illustrates an abstract representation of event propagation in the type system. A plurality of sink objects, labeled sink object$_1$, sink object$_2$, and sink object$_n$, subscribe to an event, such as event$_1$. The source object, upon occurrence of the specified trigger, generates the event$_1$ notification for the event transformer objects. In turn, the event transformer objects relays the events to the sink objects.

As discussed above, objects may have explicitly defined states, and for each state, one or more legitimate predecessor and successor states are specified. Furthermore, the objects, through use of events, specify actions to perform before and after the state transition occurs. The use of rules, states and events in the type system of the present invention results in a powerful approach to application development, namely the application modeling approach.

Figure 4:
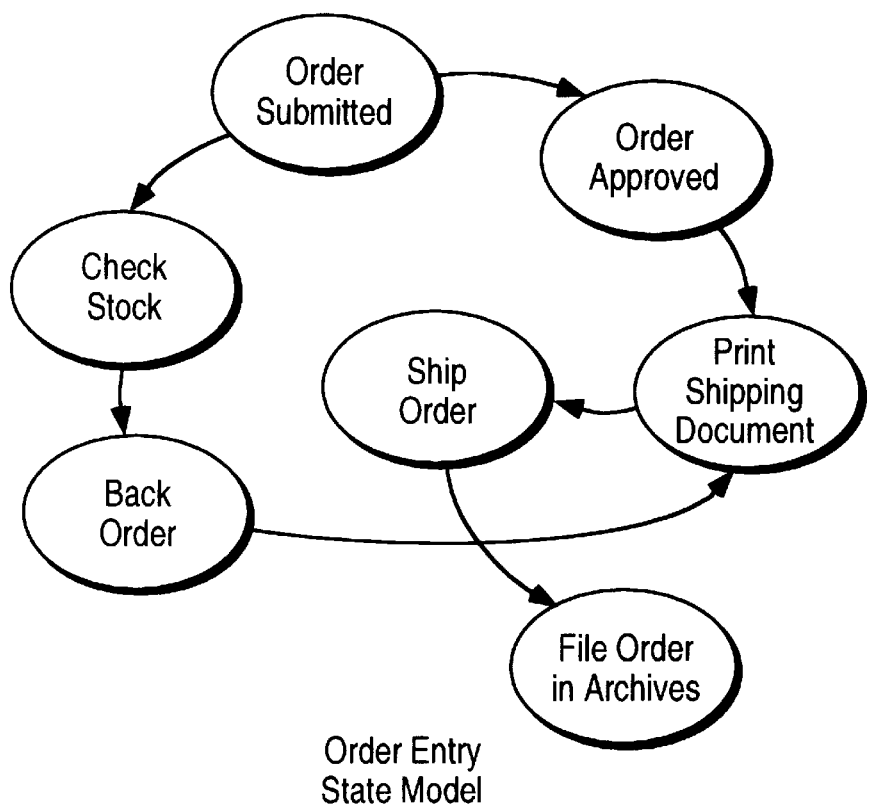
FIG. 4 illustrates an example state model for a sales order application.

An example of the application modeling approach may be illustrated through a sales order application. FIG. 4 illustrates an example state model for a sales order application. For the sales order application, the state model tracks the process through a complete cycle. Specifically, the state model of FIG. 4 contains a state for each step in the sales order cycle. The states designated in FIG. 4 are encompassed within a circle. The sales order state model starts with the a customer that submits an order. This is signified in the state model with the "Order Submitted" state. The state model also includes states for "Order Approval", "Check Stock", "Print Shipping Documents", "Ship Order", "Back Order", and "Archive Order."

In addition to defining each state to model the application, the application developer specifies permissible state transitions to define the behavior of the state model. Specifically, the user defines one or more state transitions that specify the permissible paths from each predecessor state to one or more successor states. In the state model example of FIG. 4, the lines and arrows that connect the states designate the legitimate state transitions that may occur from one state to another in the sales order application.

For the order entry state model shown in FIG. 4, the state model behavior is specified such that the state model transitions from the state "Check Stock" to the "Back Order" state only if the goods are not found to be in stock. Also, it is permissible to enter both the "Order Approval" state and the "Check Stock" state from the "Order Submitted" state. Furthermore, a rule, which requires approval of an order and printing of shipping documents before it is shipped, is specified such that the "Ship Order" state is entered from a path that includes the "Order Approved" state and the "Print Shipping Document" state. As illustrated by the above example, a real life application may be modeled to develop an application program based on the behavior of a state model.

States used in the type system of the present invention are defined at any point in an object by a user defined field. Thus, the states are not defined in terms of derived attributes that determine their values based on the current state. Therefore, the system does not directly perceive a significance of being in one state rather than another, but it only regulates the conditions under which a transition may occur from a predecessor state to one or more successor states.

In one embodiment, states are grouped together in composites for treatment as a single state. The composite state embodiment has application for transition testing purposes. Grouping states into composites may be analogized to grouping graphics objects in a drawing system. The groupings of objects in the drawing system permits treating, for some purposes, the graphics objects as a single group. For example, the single group of graphics objects may be moved together to retain relative spacing among individual objects.

In one implementation, applications may, if explicitly specified by an applications developer, foresee transition between states to occur even if the transition is forbidden by conditions specified earlier by a developer. This permits foreign objects and legacy applications to be interfaced to this system.

The events in the type system of the present invention may be associated with states. Events may be associated with any entry into or exit from a state. In addition, events may be associated with individual paths into or out of a state. Events associated with states are specified with run time triggers that cause the execution of arbitrary user specified procedures. For example, in the sales order application illustrated in the state model of FIG. 4, entry into the "Back Order" state may raise an event to "notify the customer of the delay."

Events may be used to link two independent applications. For example, order entry and accounts receivable applications may be run as stand alone applications. These applications may be linked through defining input and output events. For this example, the order entry and accounts receivable applications may be Linked to interact as follows. The action of approving an order generates an event to create an invoice, and the action of creating an invoice generates an event to print order shipping documents. The action of shipping an order generates an event to mail the bill, and the act of receiving bill payments generates an event to close the order.

To implement the preceding actions between an order entry application and an accounts receivable application, an applications developer may define the following event filters defined in Table I.

TABLE 1

| Output Event | Input Event |
| --- | --- |
| Order Entry: APPROVED | Receivables: CREATE |
| Receivables: NEW | Order Entry: PRINT |
| Order Entry: SHIPPED | Receivables: MAIL |
| Receivables: PAID | Order Entry: CLOSE |

For each event filter, any arguments required by the input events are defined. For the accounts receivable "create" event example, an argument for the "bill amount" requires definition such that the bill amount is equal to the order entry total.

As illustrated by the above example, state models and events provide a standard integration mechanism among applications. Through use of the type system events, users may define event filters to integrate a company's entire suite of applications, if desired, even if the applications derived from different parties. Even if an application was not developed using a state model, a user or later developer may easily build a state model for the applications afterwards, by invoking methods and then creating event filters for integrating the application with other applications.

Figure 5:
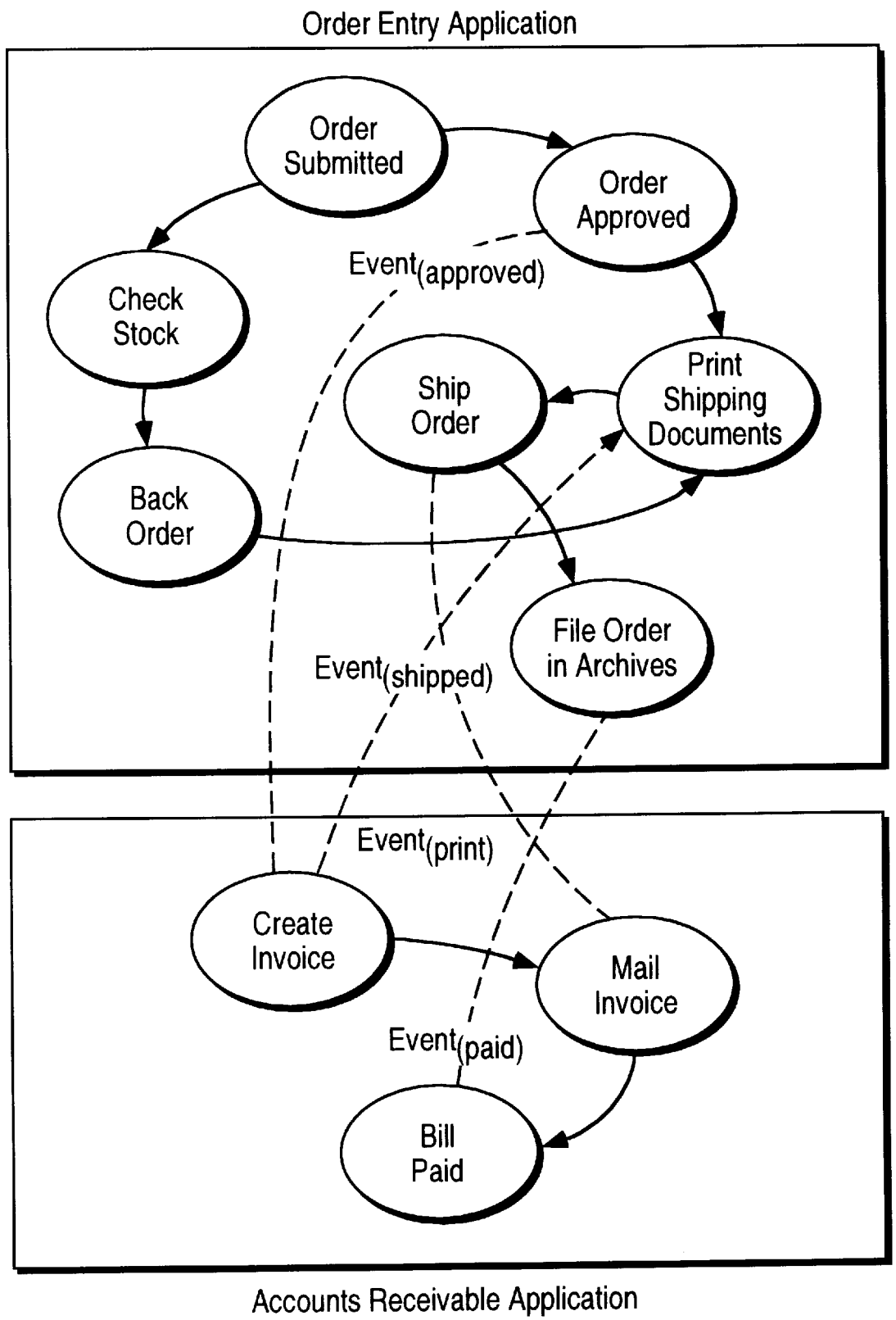
FIG. 5 illustrates state models for the example order entry and accounts receivable applications as well as their linking through events.

FIG. 5 illustrates state models for the example order entry and accounts receivable applications as well as their linking through events. The solid lines indicate the permissible state transitions, and the dashed lines indicate the events and their association with other states. Note that the functionality indicated by the state may be implemented in one or more methods. For example, a method is called to execute the "ship order" function, and the calling of the "ship order" method triggers the event "shipped." On the receiving end, a method is called to "mail invoice" to perform the functionality specified by this state.

As discussed above, rules may be triggered as states transition through a state model. Also, rules may cause the transition through the state model. An association may be described in terms of rules. For example, a rule may be defined such that if an attribute of an object is changed, then the action of the rule may change an attribute of a specified object (e.g., the triggering of the rule invokes a set attribute call to the associated object. Therefore, applications may be built by specifying when an object fires events and by defining events that cause motion through a state model. In turn, motion through the state model causes other events and other methods to be invoked.

Figure 6:
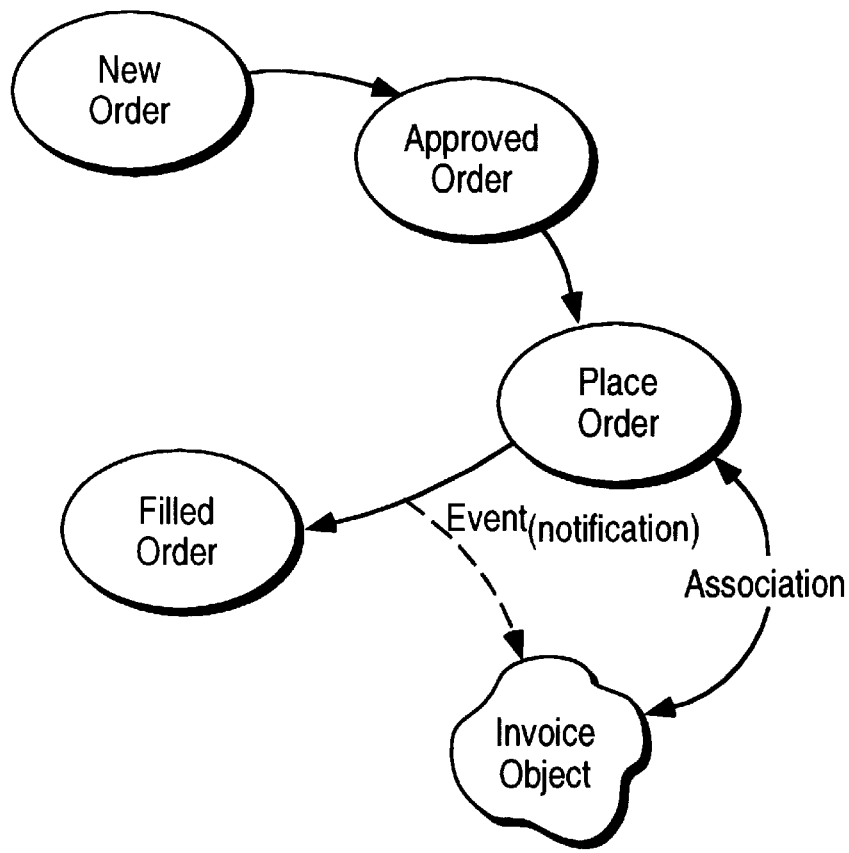
FIG. 6 illustrates a simplified state model consisting of a "New Order" state, an "Approved State", a "Place Order" state, and a "Filled Order" state.

Associations and events permit augmentation of state model behavior. FIG. 6 illustrates a simplified state model consisting of a "New Order" state, an "Approved State", a "Place Order" state, and a "Filled Order" state. In addition to this order entry state model, a user may wish to include an invoicing function that is implemented in an "Invoice Object."

To accomplish this, the user associates the invoice object with the object used to implement the place order function. Also, the transition between the "Approved Order" state and the "Placed Order" state is utilized to fire off a notification event. During execution, when the "Place Order" state is transitioned to the "Filled Order" state, the invoice object receives the event notification to implement the account receivable functionality. Thus, additional functionality may be implemented to an existing state model through use of events and associations.

Figure 7:
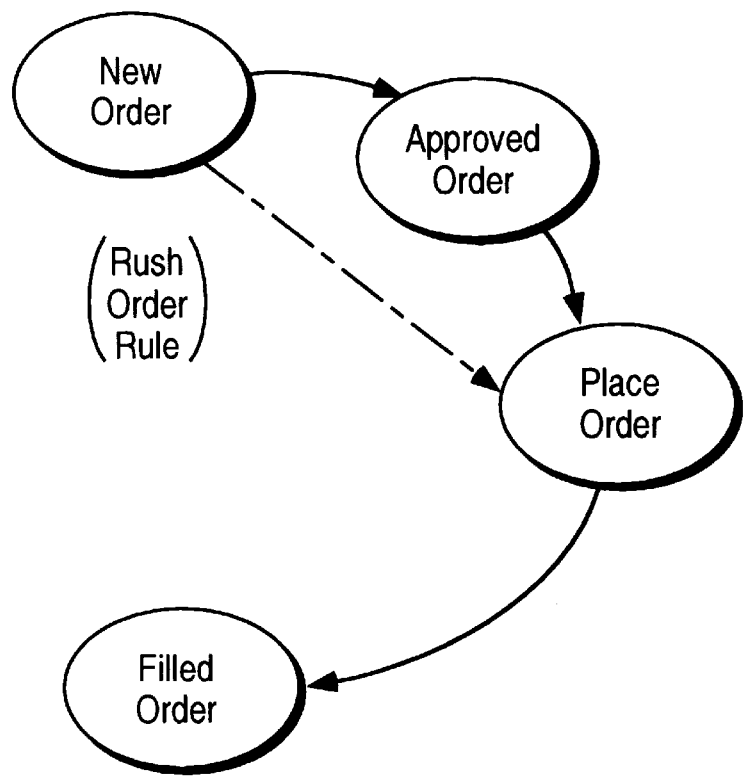
FIG. 7 illustrates adding a rule to the order entry state model of FIG. 6 to implement the specialized case of a rush order.

In addition to augmenting state models with events and associations to provide additional functionality, state models may be specialized after implementation. For the example order entry state model illustrated in FIG. 6, a user may wish to add specialized rules that apply to a rush order. FIG. 7 illustrates adding a rule to the order entry state model of FIG. 6 to implement the specialized case of a rush order. This example includes changing the permissible state transitions for a rush order. Specifically, to expedite the order entry process, a rush order rule permits transitioning from the "New Order" state directly to the "Place Order" state. Table 2 shows the rule trigger, condition, and action for implementing the rush order rule.

TABLE 2

| Rule Trigger | Condition | Action |
|---|---|---|
| "New Order" State Entered | State of Rush Order attribute | Call "Place Order" Method |

The rule is triggered when the "New Order" state is entered. The object, which is associated with the state model, contains a rush order attribute. The state of the attribute determines whether the order is a rush order. If the rush order attribute indicates that the order is a rush order, then the action of calling both the place order method and the approved order method is executed. Alternatively, if the state of the rush order attribute indicates that this is not a rush order, then the normal state flow (e.g. transitioning only from the "New Order" to the "Approved order" state occurs). Thus, a rule that governs the behavior of a state model may be added without affecting the existing rules as well as without requiring new implementation of the state model.

In one embodiment for application program development, the application program developer describes the structural nature of a class type. The developer then describes states as well as the legal transitions among the states. Also, associations and events are used to link objects. Furthermore, rules may be used to specify object behavior. To support the events, event handlers may be written in 4GL scripting language. This technique allows combining state models, rules and handlers to implement a diagram. Thus, the behavior of objects, including the relationship among the objects, may be described, and the system will enforce this specified behavior at run time.

The type system of the present invention is dynamic. For example, a user may add or remove a rule which results in the rule immediately being enforced. In addition, a script may be generated that ties in additional rules for enforcement by the type system. Therefore, rules are dynamic such that they may be added and subsequently enforced by the system after a state model has been defined.

An Implementation of Rules In An Object Oriented System

Figure 8:
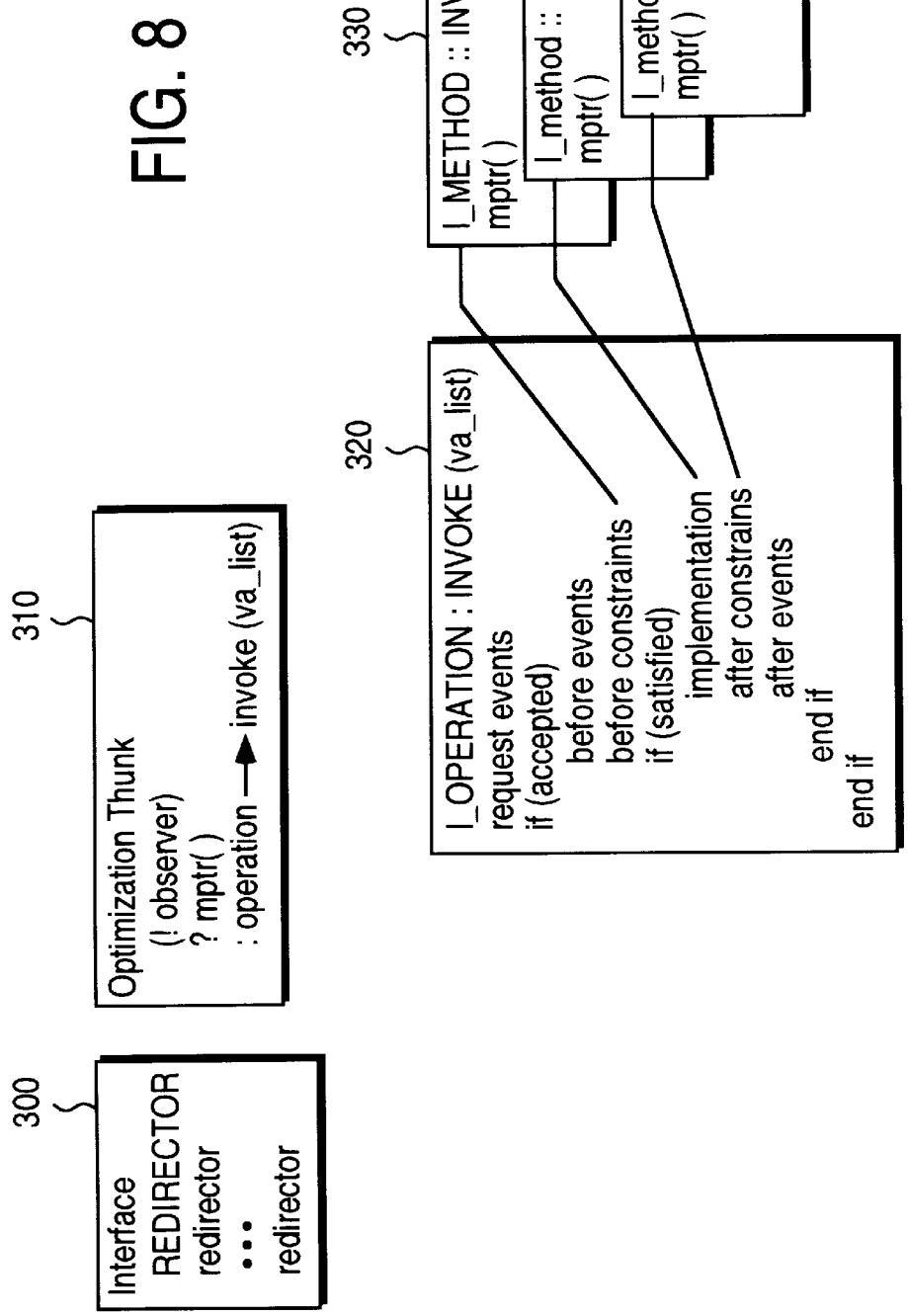
FIG. 8 is a block diagram illustrating program modules for implementing rules of the present invention.

FIG. 8 is a block diagram illustrating program modules for implementing rules of the present invention. In general, the block diagram of FIG. 8 conceptually illustrates routine and methods that execute the program flow for one implementation of rules. As shown in FIG. 8, an object interface 300 includes a plurality of redirectors. The redirectors are configured as the operation (See FIG. 1). The term "redirector" refers to the operation that re-directs the program flow from the actual method called to the pinch-point operation. Typically, an object interface calls methods, implemented for that particular interface, through use of the virtual tables ("v_tables").

From the object interface 300, program flow is directed to an optimization thunk 310. In general, the optimization thunk 310 implements the pinch point operation to determine whether any rules, either before rules or after rules, exist for the corresponding operation. One embodiment for the pinch point operation follows.

```
find before rules and evaluate them
    if (rules succeed)
        find override or default method and invoke it
        find after rules and evaluate them
    end if
```

If no rules exist, the optimization thunk 310 calls the actual method (e.g., mptr()). If any rules exist, the optimization thunk invokes the I_Operation 320 to invoke the rules identified on the before rules list 120 and/or the rules identified on the after rules list 140 (FIG. 1). For this embodiment, the I_Operation metaobject contains the Invoke method that manages the look-up and dispatch of instance and class level rules. The I_Operation metaobject also appropriately dispatches the original method. Pseudo code for implementing I_Operation is shown in block 320 of FIG. 8. The actual method (i.e., mptro), is invoked, as appropriate, from I_Operation as is illustrated by the arrows connecting I_Operation block 320 to the I_method blocks 330 on FIG. 8. For this embodiment, as shown in FIG. 8, the v_tables include redirectors to an optimization thunk, which in turn calls I_operation. If appropriate, I_Operation invokes the rules, either before or after the actual method. The I_method, invoked from I_Operation, calls the actual method. After all rules and the actual method are executed, the I_Operation, through a "closure" procedure, returns to the caller.

For the embodiment shown in FIG. 8, the process for implementing rules includes two levels: an "outer" and an "inner." The inner level invokes, from the method closures, the actual methods, whereas the outer level invokes, based on the redirector v_table or operation, the rules. Static v_table calls (e.g., prior compiled static code) go to the same location as dynamically loaded calls of the operation pinch point. From the callers point of view, the distinction between the outer invocation of the actual method and the inner invocation of the actual method is transparent. For this implementation, the operation evaluates rules, whereas the method closure strictly calls the actual method. However, in another embodiment, such as for deferred notifications, a method closure is implemented around the outer v_table member functions. In this case, the pinch point operation is bypassed for efficiency or semantic reasons. Distinction between the outer and inner calls when implementing different variations disclosed herein may help reduce spurius events, slow down, or infinite recursion.

In one embodiment, the closures are utilized to allow deferred calling or continuations. In general, the closures maintain or hold all parameters/variables in the current context (i. e., the context when the operation was called) until the later time in which the actual method is invoked. One embodiment for implementing a closure to support rules follows.

```
Interface I_Closure : Iunknown ! Alias(Closure)
{
    Document
    {%
    The I_Closure interface supports deferred calling.
    It can be used to save the state of the parameters for a call
    so that the call can be invoked later from a different context.
    %}
```

-continued

```
Production
{
    File            ="imclos";
    UUID       = 581AF132-BA46-11CF-BC3C-524153480003;
    FullName = "Closure Interface";
}
typedef ULONG VALIST ! ProtectBy(_VARARG_Visible);
//TODO:
marshal
    Methods
    {
        HRESULT SetFormal(I_Method *pConv, I_Operation *pSig)
        ! Document
        {% SetFormal analyzes the operation's signature and caches
resolved
            information such as size, type, parameter indirection, vtable
index etc.
            Should be called once to initialize the closure.
            Note: that if the closure is created from the context of a
            method
            via CreateClosure, SetFormal need not be called. The method
would
            already have performed the initialization.
        %};
        HRESULT SetActualData(
            I_Array* ParamArray
            ! Document {% The parameters for this
method. %},
            Iunknown *Object !(in, iid_is(rIID))
            ! Document (% The object on which this
method is a member.%},
            REFIID rIID
            )
        ! Document
        {% SetActualData copies data from the array of I_Data into the
closure,
            where it is held until Invoke is called.
        %};
        HRESULT SetActual(IUnknown *Object, VALIST Parameters)
        ! Document
        {% copies data from the va_list into the closure.
            Its separate from Invoke to allow holding data for deferred
            calls.
        %};
        HRESULT Invoke ()
        ! Document
        {% Invoke makes the call using the information cached by
SetFormal
            and SetActual
        %};
        HRESULT GetActualData(I_Data **pRet, I_Array *pArg)
        ! Document
        {% GetActualData retrieves the actual parameters from the
closure and
            places them into the array of I_Data.
            Used to retrieve the outbound parameters after Invoke is
            called.
        %};
        HRESULT GetActual(VALIST Parameters)
        ! Document
        {% Copies data from the closure into the va_list.
            Used to retrieve the outbound parameters after Invoke is
            called.
        %};
    }
}
```

In one embodiment, the pinch point operation is executed with a thunk. In general, a thunk is compiler generated code executed between the callers code and the calling code. Typically, thunks in the prior art have been utilized to convert calling conventions between the caller code and the calling code. For efficiency reasons, in one embodiment, the thunk is generated in assembly level code so as to minimize the execution time. For the rules implementation, for each call to a method, the redirector in the object interface redirects the call to the thunk routine. This process is executed even if no additional rules are added to the called method. Accordingly, if the "checking" routine, which determines whether any overrides or rules exist, is inefficient, the overall performance of the software may be substantially degraded. Thus, in the preferred embodiment, the "checking" routine is implemented with extremely efficient assembly language level code.

Figure 9:
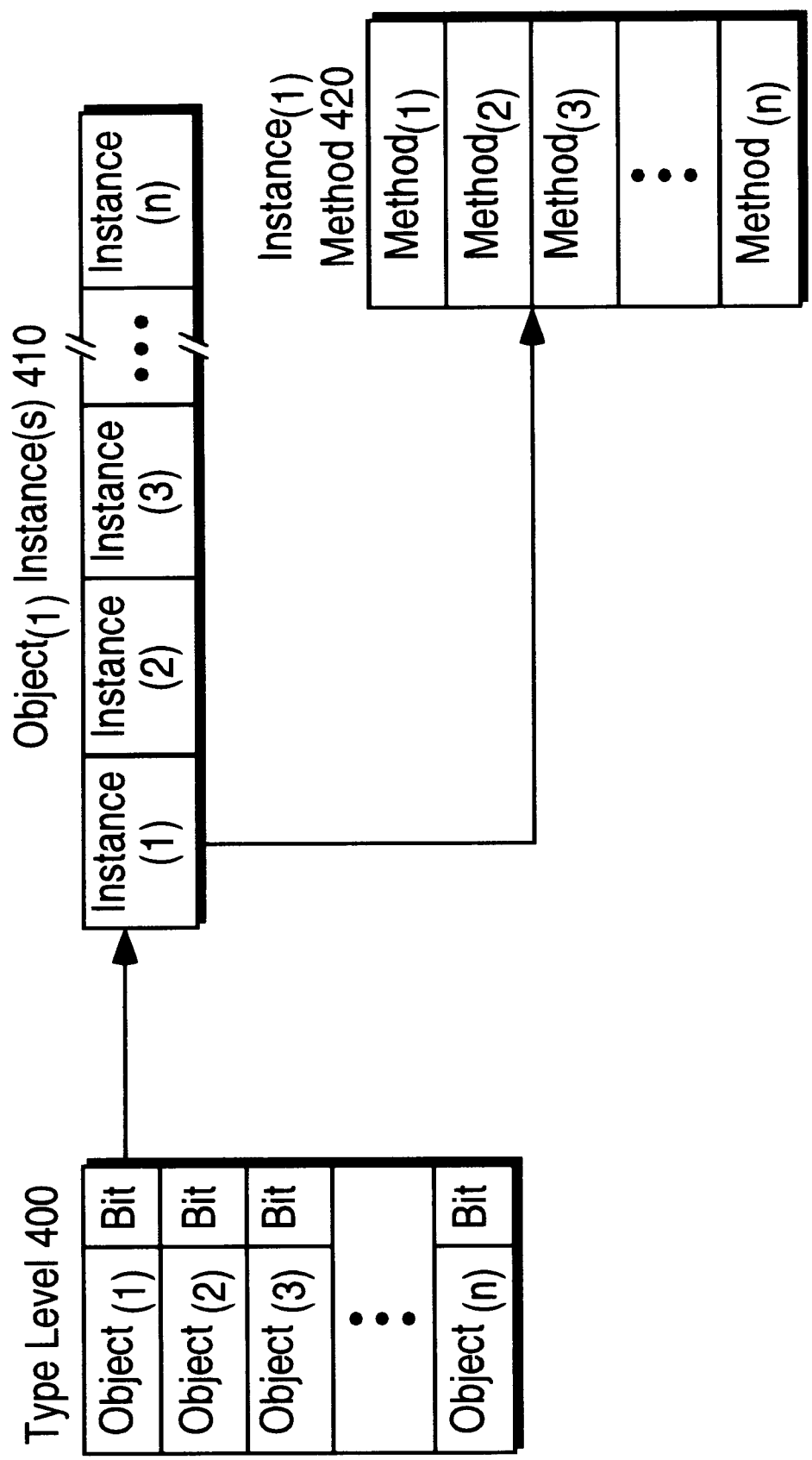
FIG. 9 is a block diagram illustrating a plurality of bit maps for use with one embodiment of the optimization thunk.

FIG. 9 is a block diagram illustrating a plurality of bit maps for use with one embodiment of the optimization thunk. For this embodiment, a type level bit map 400 identifies whether any override or rule exists for the corresponding object, on the type or class level. The type level bit map 400 may be implemented with a single bit for each object that indicates whether a method or override exists. In one embodiment, the bit maps are 32 bits in length to permit checking of bits in a single operation. As is well known in object oriented programming, each object may be identified through a global unique identifier ("GUID").

The bit maps of FIG. 9 further include, to implement rules on a per instance basis, an object instance bit map 410. As shown by the line and arrow on FIG. 9 that connects object$_1$ in the type level bit map 400 to the object$_1$ instance bit map 410, each object includes an object instance bit map 410. For simplicity, only one such object instance bit map 410 is shown in FIG. 9. In general, the object instance bit map 410 identifies, for the corresponding object, whether the specific instance includes method overrides or rules. The object instance bit map 410 is implemented with a single bit for each object instance (e.g., instance$_1$, instance$_2$, instance$_3$, ... instance$_n$).

For each object instance in the object instance bit map 410, a corresponding instance method bit map 420 exists. The instance method bit map 420 indicates whether a specific method, on the corresponding object instance, includes any method overrides or rules. The bit maps illustrated in FIG. 9 provide information, on a per type level and instance level, to identify methods with rules, by simply examining a single bit for each bit map. The thunk implementation, which only checks a single bit initially, requires very little program overhead. In contrast, checking for rules by calling the corresponding method would result in a significant amount of overhead that would reduce the efficiency and performance of the software. Because the thunk is generated by the compiler, the user, implementing rules on methods, is not required to program code to check each method called for rules.

Figure 10:
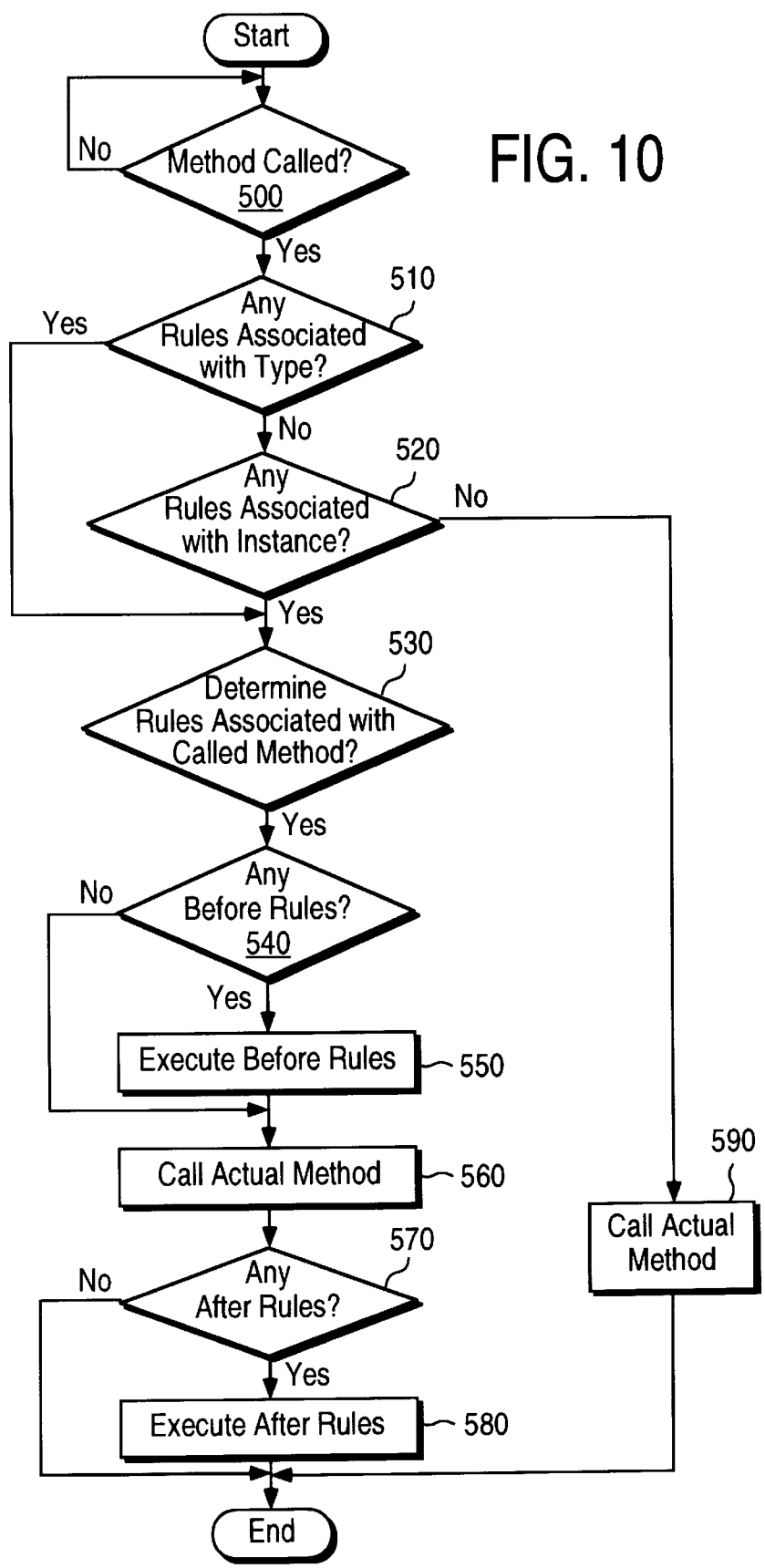
FIG. 10 is a flow diagram illustrating one embodiment for implementing rules.

FIG. 10 is a flow diagram illustrating one embodiment for implementing rules. When a method is called, a determination is made as to whether any rules associated with the class type of the method called exists, as shown in blocks 500 and 510. If no rules are associated on the class level, a determination is made as to whether any rules are associated on the instance level, for the particular instance of the method called as shown in block 520. As shown in block 530, if any rules are associated with the class of the method called, either on the type level or instance level, then a determination is made as to whether the method called has any associated rules. If so, the before rules list is checked, and any such before rules are executed as shown in blocks 540 and 550. As shown in block 560, the actual method is called. If any after rules exist, the after rules are executed as shown in blocks 570 and 580. If no rules are associated with the object, on either the class or the instance level, then the actual method is called as shown in block 590.

Object Oriented Development Environment

Figure 11:
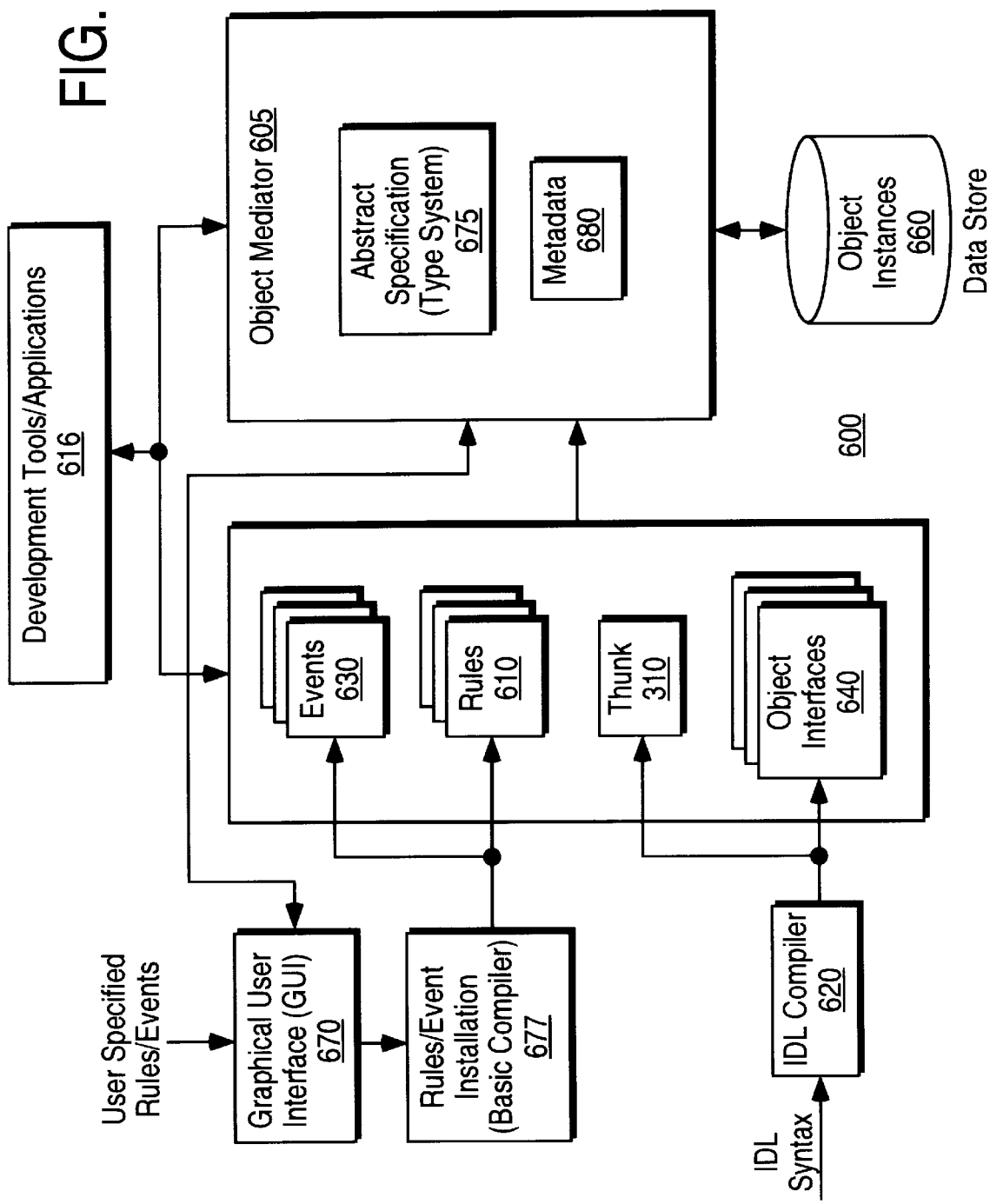
FIG. 11 is a block diagram illustrating an object oriented development environment that incorporates the techniques of the present invention.

FIG. 11 is a block diagram illustrating an object oriented development environment that incorporates the techniques of the present invention. An object mediator 605 permits users of the object oriented development environment create new object types, edit object types as well as to instantiate and manipulate objects from the object types. The object mediator 605 operates in conjunction with any number of program development tools, such as CASE tools, and application programs, such as a form building program. The program development tools and application programs are illustrated by the development tools/applications block 616. The development tools/applications programs 616 includes fourth generation language (4GL) capability, that permits the user to generate scripts for execution in conjunction with compiled 3GL classes and declarative rules and events.

For this embodiment, the object mediator 605 accesses metadata 680, including object interfaces 640, rules 610, events 630, and abstract specifications (type system) 675. In general, the object mediator 605 permits a user to instantiate objects based on the type system 675. The object mediator 605 is intended to represent a layer of software that permits a user to manipulate the metadata for use in programming development. For example, the object mediator 605 may support a C++ programming platform. The object mediator 605 executes those functions typically found in an object oriented development environment, including, but not limited to, creating new object types, editing object types as well as instantiating objects from the object types and in fact object mediator 605 is intended to represent a broad class of software that performs these functions.

As shown in FIG. 11, the object oriented development environment also includes an object store 660. In general, the object store 660 stores object instances defined by the abstract specification (type system ) 675 (i.e., object instances persist in the object store 660). For example, the object store 660 may comprise an object oriented database or a relational database.

The object oriented development environment 600 further includes a graphical user interface (GUI) 670 that permits a user to interface with the object oriented software development environment. In one embodiment, the GUI 670 displays, on an output display of a computer, a dialog box to permit a user of the system to input parameters that specify rules and events. The user may both add and delete rules and events from objects. Also shown in FIG. 11, for this embodiment, the GUI 670 transfers the rule/event parameter information to the rules/event installation module 677. In general, the rules/event installation module 677 installs rules 610 and events 630 that correspond with types and/or instances of the system. In one embodiment, the rules/events installation module 677 comprises, in part, a Basic Programming Language Compiler. For this embodiment, the Basic Programming Language Compiler receives rules and events, expressed in the Basic Programming Language, and compiles the code for execution by the system. The rules/events installation module also updates the list of rules 610 and the list of events 630, as described below in conjunction with a description of FIG. 12.

The object oriented software development environment 600 further includes an interface definition language (IDL) compiler 620 that generates the object interfaces 640 and the thunk 310. As described above, the object interfaces 640 include "re-directors" to execute the thunk 310 in response to the calling of a method supported by an object interface 640. As shown in FIG. 6, the thunk 310 is also generated by the IDL compiler 620.

Figure 12:
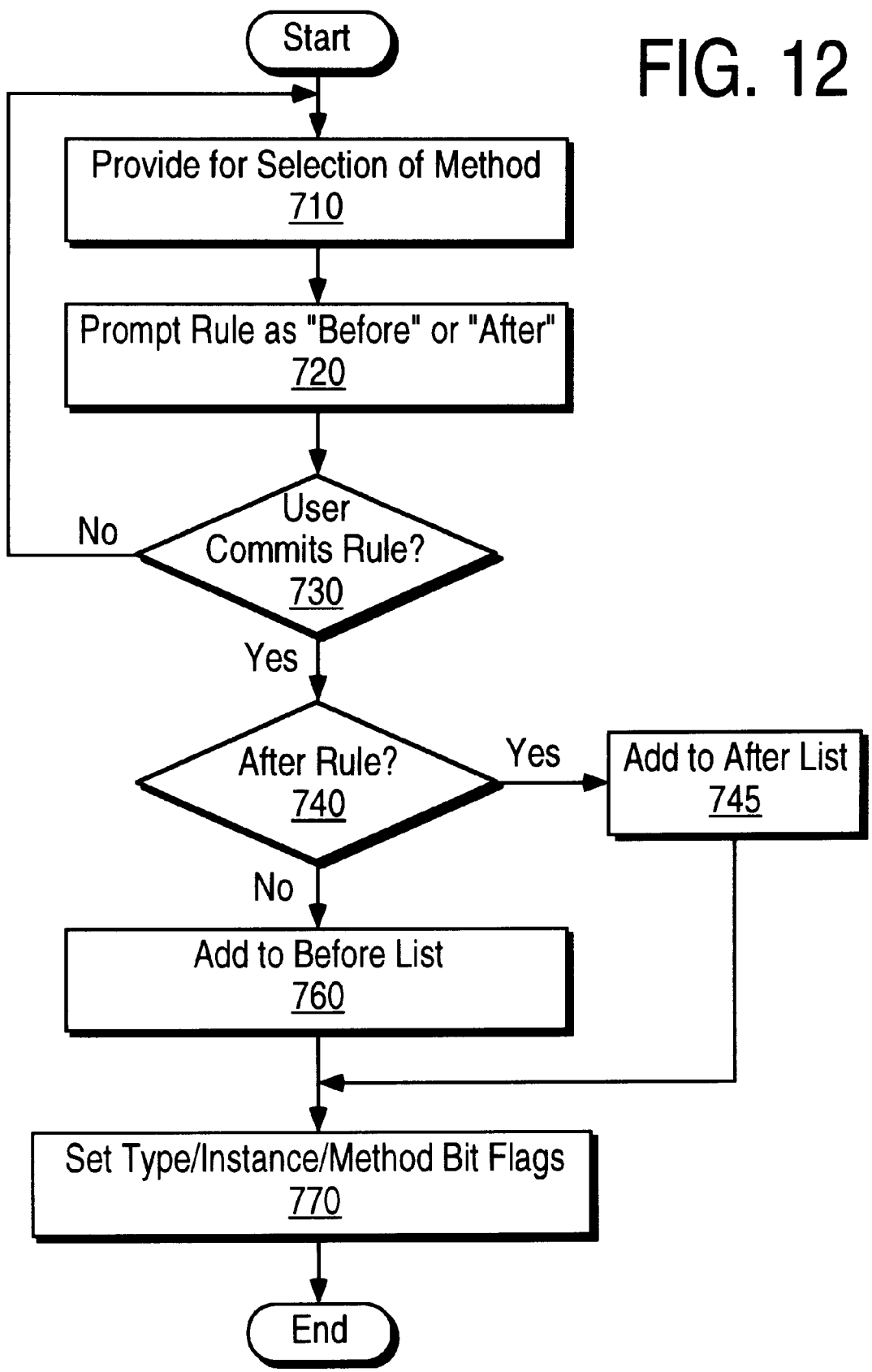
FIG. 12 is a flow diagram illustrating one embodiment for installing a rule.

The rules of the present invention permit augmenting a method with rules even though the method is already compiled (e.g., a C++ compiled class). FIG. 12 is a flow diagram illustrating one embodiment for installing a rule. As shown in block 710, the object oriented development environment provides a means for selecting an object to alter. The developer, through a prompt, defines the rule as a "before rule" or an "after rule" as shown in block 720. As shown in block 725, the developer enters the declarative rule. To commit the rule, the user enters an indication (i.e., double clicks on a commit box within a dialog box). In response to committing the rule, if the rule is an after rule, then the rule is added to the after rule list for the corresponding class/instance/method as shown in blocks 740 and 750. If the rule is a before rule, then the rule is added to the before rule list for the class/instance/method as shown in blocks 760 and 765. In addition, the bit flags for the type/instance/methods are set as shown in block 770.

The following example code adds and deletes rules from the object oriented software environment.

---

```
interface I_Object and I_AbstractDataType
{
    HRESULT AddRuleBenefactor(I_InheritableType * pBenefactor)
        ! Document {%
AddRuleBenefactor notifies this object that pBenefactor has
inheritable rules for this type. This could turn out to be a pointer
to the object's type, but if the immediate type doesn't have
any rules it would refer directly to the first supertype which has rules.
    %};
    HRESULT RemoveRuleBenefactor(I_InheritableType *
    pBenefactor)
        ! Document {%
RemoveRuleBenefactor removes an I_InheritableType that no longer has
rules for this object.
    %};
    HRESULT HasRules(OMRuleTriggerType trigger, I_Member *
    Member
    ! Document {% The specific member being evaluated. For high level
rules pertaining
to all members this parameter may be 0. %},
    I_Iterator * Rules
    !(out)
    ! Document {% Receives an iterator if the object has rules that are
evaluated in
response to any of the rule triggers
        identified by trigger, otherwise returns NULL. %}
    I_InheritableType ** NextSource
    !(out)
    !Document {% Receives an I_InheritableType if the object's type
        has
further rules
that might be evaluated in response to any of the rule triggers identified
by
trigger,
otherwise returns NULL. You need to call NextSource's FindRule method
to ensure an
exhaustive search for rules. %}
    )
    ! (Virtual)
    ! Document {% Check to see if an object has rules
        that are evaluated in response to particular situations identified
by
trigger. You can pass a list of trigger types as trigger with each trigger
type separated
by the logical OR symbol. The iterator may be used to find the specific
OMRuleTriggerTypes
which trigger the evaluation of the object's rules. For example, if you pass
three MruleTriggerType values as trigger and result is TRUE, the object's
rules might be
evaluated in response to 1, 2, or all 3 of the OMRuleTriggerType triggers.
%};
    I_Collection * I_Object::Rules
}
Interface I_CodeUnit : Iunknown
{
    Document
```

-continued

```
{%
    The interface I_CodeUnit manages one compilation unit of source
code.
    A compilation unit is a group of snippets of source code.
    Usually they correspond to all the overides for a class by one
language.
%}
Attributes
{
    I_AbstractDataTypeComp * ContextType ! Association
    (UnitContext)
    ! Document
        {% Context this code unit should be compiled within.
        %};
    I_Collection * Methods // I_Collection<I_Method *>
    ! (Read)
    ! Association (MethodToUnit)
    ! Document
        {% Snippets returns a collection of the methods in this
compilation unit.
        %};
    I_ErrorMgr *Errors
    ! (Read)
    ! Document
        {% Errors returns a list of syntax errors.
        %};
    BOOL Dirty
    ! Document
        {% Dirty returns TRUE if any snippet has been changed;
            otherwise, it returns FALSE.
        %};
    GUID Language
    ! Document
        {% Language identifies the language interpreter for this unit.
\+
par
    \par
    Read/write attribute.
    %};
    INT UnitId
    ! (Read)
    ! Document
        {% UnitId is used internally to identify the unit. \par
        \par
        Read-only attribute.
        %};
};
```

Integration of Three Styles of Programming

The type system of the present invention supports integration of three styles of application program development in an object oriented environment. In one approach, the type system supports the use of a declarative approach to application program development. For the declarative approach, a user specifies the functional operation of the application program. In one embodiment, the user specifies the functional operation of the application program through use of rules and events, as described above. The declarations are enforced by the type system. Thus, the user is not required to write code to enforce the declarations.

The type system also supports a third generation languages (3GL) compiled approach to applications program development. For the 3GL compiled approach, the user develops classes, through use of languages such as C++ and Pascal, to implement the application program. The code is then compiled for run time operation. The 3GL compiled approach to application program develop provides a powerful tool for implementing a wide range of functionality for the program. In one embodiment, the 3GL compiled approach is developed through use of an extended interface definition language (EIDL). The EIDL permits a user to define types in accordance with the extended type system of the present invention. The EIDL code is then compiled, through use of an EIDL compiler, for run time operation in the object oriented environment.

The object oriented development environment of the present invention further supports applications development through use of fourth generation language (4GL) scripting. As will be appreciated by one skilled in the art, the integration of the declarative, the 3GL compiled and the 4GL scripting approaches provides the greatest flexibility and power to develop application programs. For example, a declarative approach to application program development provides a good way to add features or functionality that is not part of the original system. However, traditional declarative systems have limitations such that some objectives cannot be expressed in a declarative manner. Therefore, integrating the declarative, 3GL compiled and 4GL scripting approaches provides the application program developer the ability to select a style that most suits the particular needs for a given problem.

Computer System

Figure 13:
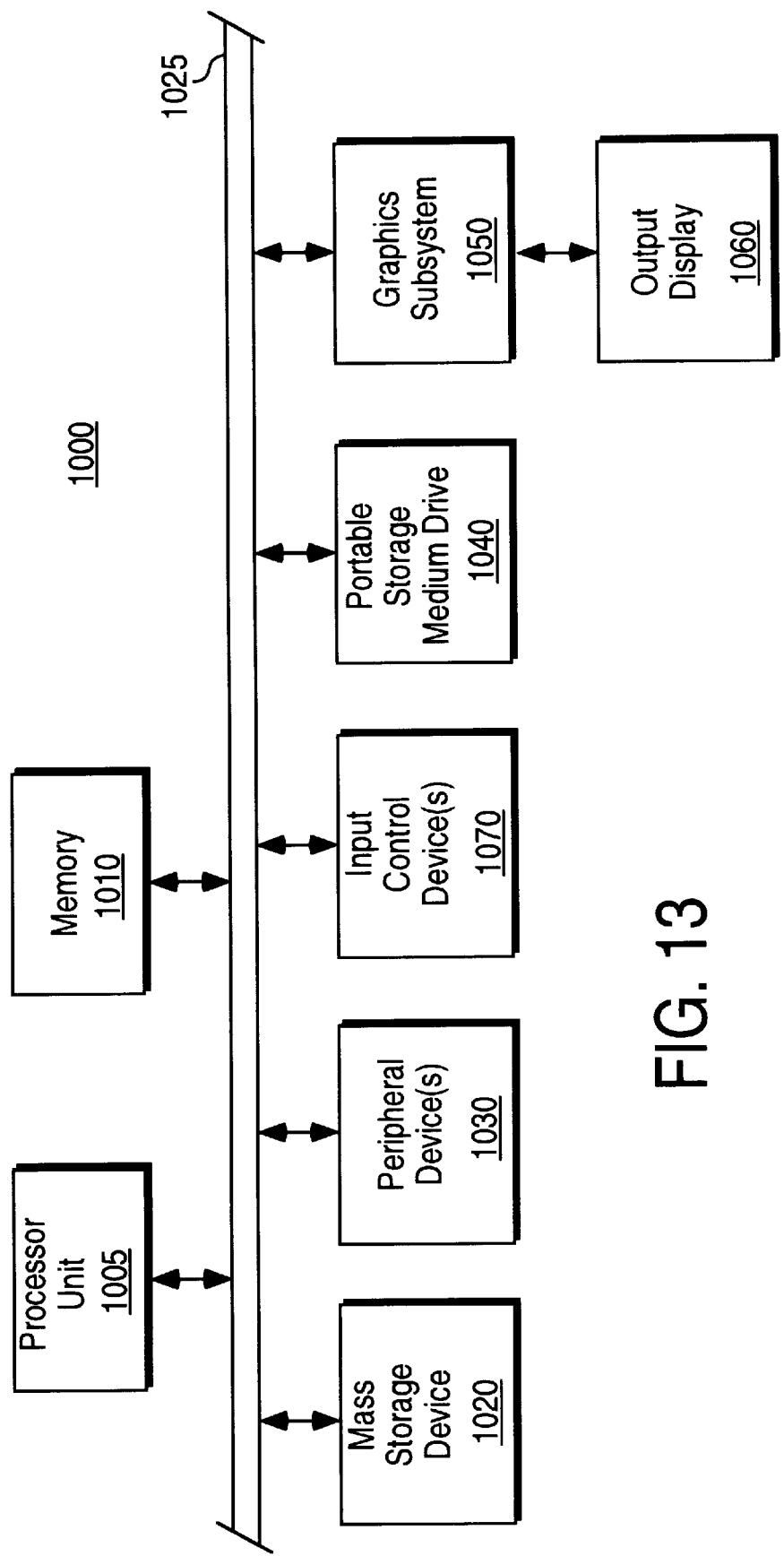
FIG. 13 illustrates a high level block diagram of a general purpose computer system in which the object oriented development system of the present invention may be implemented.

FIG. 13 illustrates a high level block diagram of a general purpose computer system in which the object oriented development system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. The main memory 1010 stores the executable code of the object oriented development system when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 13 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the object oriented development system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the object oriented development system software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network. The object oriented development system software may be input to the computer system 1000 via a portable storage medium or a network.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

The object oriented development system may be implemented in either hardware or software. For the software implementation, the object oriented development system is software that includes a plurality of computer executable instructions for implementation on a general purpose computer system. Prior to loading into a general purpose computer system, the object oriented development system software may reside as encoded information on a computer readable medium, such as a magnetic floppy disk, magnetic tape, and compact disc read only memory (CD-ROM). In one hardware implementation, the object oriented development system may comprise a dedicated processor including processor instructions for performing the functions described herein. Circuits may also be developed to perform the functions described herein.

Although the present invention has been described in terms of specific exemplary embodiments, it will be appreciated that various modifications and alterations might be made by those skilled in the art without departing from the spirit and scope of the invention.

What is claimed is:

1. A method for customizing functionality of an object in an object oriented software system, said method comprising the steps of:

receiving an identification of at least one compiled object, wherein said compiled object comprises at least one method;

receiving one or more declarative statements to augment the functionality of said method of said compiled object, wherein a declarative statement comprises a constraint or requirement generally associated with said method of said compiled object;

generating a dynamic association between said one or more declarative statements and said method identified on said compiled object, wherein said dynamic association links said declarative statements to said method on said compiled object without re-compiling said object; and executing said declarative statements such that when said method on said object is called, said one or more declarative statements, associated with said method, are executed in addition to said method.

2. The method as set forth in claim 1, wherein the step of generating a dynamic association between said one or more declarative statements and said method comprises the step of associating a rule to said method.

3. The method as set forth in claim 2, wherein the step of associating a rule to said method comprises the step of associating a rule to execute before execution of said method.

4. The method as set forth in claim 2, wherein the step of associating a rule to said method comprises the step of associating a rule to execute after execution of said method.

5. The method as set forth in claim 1, wherein the step of generating a dynamic association between said one or more declarative statements a method on an object comprises the step of associating one or more declarative statements to a method on a specific instance of said object.

6. The method as set forth in claim 1, wherein the step of generating a dynamic association between said one or more declarative statements a method on an object comprises the step of associating one or more declarative statements to a method on a type level that defines said object.

7. The method as set forth in claim 1, wherein the step of generating a dynamic association between said one or more declarative statements and said method comprises the steps of:

associating said method to a second method; and generating an event to fire from said method to said second method.

8. The method as set forth in claim 1, wherein the step of associating one or more declarative statements to a method on an object comprises the steps of:

redirecting said call to said method to a pinch-point operation;

determining, in said pinch-point operation, whether any declarative statements are associated with said method called; and executing said one or declarative statements when any declarative statements are associated with said method called.

9. The method as set forth in claim 8, wherein said the step of redirecting said call to said method to a pinch-point operation comprises the step of redirecting said call to said method in an interface for said object that exposes said method.

10. The method as set forth in claim 8, wherein said pinch point operation comprises an optimization thunk implemented in assembly language.

11. A method for customizing functionality of objects in an object oriented environment, said method comprising the steps of:

storing a plurality of objects, each object comprising at least one method and an interface, said interface comprising a redirector;

storing a pinch-point operation;

receiving one or more declarative statements to augment the functionality of said method of said object;

receiving a call, via said interface, to execute said method;

redirecting, said call from said method to said pinch-point operation; determining, from said pinch-point operation, whether said method on said object includes one or more declarative statements associated with said method; and executing said one or more declarative statements if said declarative statements are associated with said method.

12. A method for customizing functionality of objects in an object oriented environment, said method comprising the steps of:

storing a repository of compiled objects, wherein a compiled object comprises at least one method and said compiled objects being defined by one or more object type systems;

providing to a user a means to specify one or more declarative statements;

dynamically associating said one or more declarative statements to at least one method of an object, wherein said dynamic association links said one or more declarative statements to said method on said compiled object without re-compiling said object so as to re-direct calls from said method to said declarative statements; and executing said one or more declarative statements when said method on said object is called.

13. A method for integrating declarative, compiled and scripting approaches for developing application programs in an object oriented environment, the method comprising the steps of:

implementing an abstract specification for an extended definition type system that comprises members to enforce rules through the type system;

receiving declarative rules to implement functionality for application program development by adding one or more declarative rules to at least one method;

dynamically associating said declarative rules to at least one method of an object, wherein said dynamic association links said one or more declarative statements to said method on said compiled object without re-compiling said object so as to re-direct calls from said method to said declarative statements;

enforcing the declarative rules as rules in the type system;

receiving complied code developed from an object-oriented language and compiled to include the extended definitions for the type system, wherein the code comprises a plurality of types;

providing access to the types of the compiled code for application development;

receiving scripts developed from a four generation language (4GL) to specify functionality for application program development; and enforcing the scripts as rules in the type system.

14. A computer readable medium comprising a plurality of instructions, which when executed by a computer, causes the computer to perform the steps of:

receiving an identification of at least one compiled object, wherein said compiled object comprises at least one method;

receiving one or more declarative statement to augment the functionality of said method of said compiled object, wherein a declarative statement comprises a constraint or requirement generally associated with said method of said compiled object;

generating a dynamic association between said one or more declarative statements and said method identified on said compiled object, wherein said dynamic association links said declarative statements to said method on said compiled object without re-compiling said object; and executing said declarative statements such that when said method on said object is called, said one or more declarative statements, associated with said method, are executed in addition to said method.

15. The computer readable medium of claim 14, wherein:

the step of generating a dynamic association between said one or more declarative statements and said method identified on said compiled object comprises the step of generating redirectors, on an interface exposing said object, to redirect a method call to a pinch-point operation; and the step of executing said declarative statements comprises the step of executing said pinch-point operation to determine if any declarative statements are linked to said method.

16. The computer readable medium of claim 14, wherein the step of generating a dynamic association between said one or more declarative statements and said method comprises the step of generating a dynamic association between one or more declarative statements to a method on a specific instance of said object.

17. The computer readable medium of claim 14, wherein the step of generating a dynamic association between said one or more declarative statements and said method comprises the step of generating a dynamic association between one or more declarative statements to a method on a type level that defines said object.

* * * * *